(12) United States Patent
Boulet et al.

(10) Patent No.: US 8,303,683 B2
(45) Date of Patent: Nov. 6, 2012

(54) GUARD LAYERS FOR RAPID CYCLE PRESSURE SWING ADSORPTION DEVICES

(75) Inventors: Andre Jason Boulet, Vancouver (CA); Amy Chiu, Richmond (CA); Brian G. Sellars, Coquitlam (CA); Andrea C. Gibbs, Burlington (CA)

(73) Assignee: Air Products and Chemicals, Inc., Allentown, PA (US)

( * ) Notice: Subject to any disclaimer, the term of this patent is extended or adjusted under 35 U.S.C. 154(b) by 406 days.

(21) Appl. No.: 12/524,157

(22) PCT Filed: Jan. 23, 2008

(86) PCT No.: PCT/CA2008/000147
§ 371 (c)(1),
(2), (4) Date: Jul. 22, 2010

(87) PCT Pub. No.: WO2008/089563
PCT Pub. Date: Jul. 31, 2008

(65) Prior Publication Data
US 2010/0300288 A1 Dec. 2, 2010

Related U.S. Application Data

(60) Provisional application No. 60/886,486, filed on Jan. 24, 2007.

(51) Int. Cl.
*B01D 53/047* (2006.01)
(52) U.S. Cl. .................... 95/96; 96/132; 96/154
(58) Field of Classification Search ............ 96/121, 96/124, 132, 150, 152, 154; 95/96, 113, 95/117
See application file for complete search history.

(56) References Cited

U.S. PATENT DOCUMENTS

| | | | | |
|---|---|---|---|---|
| 6,063,161 A | * | 5/2000 | Keefer et al. | 95/100 |
| 6,106,593 A | * | 8/2000 | Golden et al. | 95/120 |
| 7,037,358 B2 | | 5/2006 | Babicki et al. | |
| 7,160,367 B2 | * | 1/2007 | Babicki et al. | 96/116 |
| 2002/0170436 A1 | | 11/2002 | Keefer et al. | |

FOREIGN PATENT DOCUMENTS

| | | |
|---|---|---|
| CA | 2329475 A1 | 6/2002 |
| CA | 2592224 A1 | 7/2006 |

OTHER PUBLICATIONS

International Preliminary Report on Patentability of the International Searching Authority, mailed Apr. 30, 2009, for corresponding International Application No. PCT/CA2008/000147.
International Search Report and the Written Opinion of the International Searching Authority, mailed May 16, 2008, for corresponding International Application No. PCT/CA2008/000147.
European Patent Office, "Communication—Supplementary European Search Report" for European Application No. EP08706294, Dec. 10, 2010, 5 pages.

* cited by examiner

*Primary Examiner* — Frank Lawrence, Jr.
(74) *Attorney, Agent, or Firm* — Eric J. Schaal

(57) ABSTRACT

Guard layers are employed in the adsorbent beds of rapid cycle pressure swing adsorption (RCPSA) devices to protect the adsorbent therein from certain contaminants (e.g. water vapour). Conventional PSA devices typically pack the guard layer with as much guard material as is practical. In RCPSA devices however, the performance of the guard layer can be improved by using a reduced amount of guard material and increasing access to it. Such embodiments are characterized by guard layers with a channel fraction of greater than 50%.

17 Claims, 3 Drawing Sheets

GUARD LAYERS FOR RAPID CYCLE PRESSURE SWING ADSORPTION DEVICES

CROSS-REFERENCE TO RELATED APPLICATION

This is the U.S. National Stage of International Application No. PCT/CA2008/000147, filed Jan. 23, 2008, which in turn claims the benefit of U.S. Provisional Application No. 60/886,486, filed Jan. 24, 2007. Both applications are incorporated herein in their entirety.

FIELD

The present disclosure concerns embodiments of an apparatus and method for guarding beds in rapid cycle pressure swing adsorption (RCPSA) devices against contamination. In particular, it concerns the design of guard layers to be employed at the feed end of the beds.

BACKGROUND

Pressure swing adsorption (PSA) devices are used to separate at least one preferentially adsorbed component from at least one less readily adsorbed component in a feed fluid mixture. Gas separation by PSA is achieved by synchronized pressure cycling and gas flow reversals through a set of adsorber beds which adsorb the preferentially adsorbed component/s in the feed gas mixture. During each cycle, a pressurized feed gas mixture is first introduced to the feed end of the adsorber beds. The less readily adsorbed component/s pass through the adsorber beds while the preferentially adsorbed component/s are adsorbed. Thus, gas taken from the end opposite the feed end of the bed (i.e. the product end) is concentrated in the less readily adsorbed component/s. The adsorbent in the beds is regenerated later in the cycle by closing off the supply of pressurized feed gas mixture, reducing the pressure in the bed thereby desorbing the preferentially adsorbed component/s, and exhausting or purging them from the bed.

A simple PSA cycle can thus involve a single pressurization step in which gas concentrated in less readily adsorbed component/s is obtained from the product end of the beds, and a depressurization step in which gas concentrated in readily adsorbed component/s is exhausted from the feed end of the bed. However, to improve purity, yield, and efficiency, complex PSA cycles are typically employed in the art. These more complex cycles use de-pressurization and re-pressurization gas flows between feed and product ends of the adsorbent beds at various stages in the cycle. Multiple adsorption beds are required for these more complex PSA cycles.

Conventional commercial PSA devices currently employ fixed-bed adsorbents in the form of beads or pellets from about 1 mm to 4 mm in size. In order to achieve higher cycle speeds, the gas velocities within the adsorbent beds must increase, particularly for devices with multiple adsorbent beds. The maximum cycle speed for such conventional beaded bed PSA devices is however limited by such factors as bead fluidization, attrition, and also to some extent valve operation speeds and valve durability.

Rapid cycle PSA (RCPSA) devices have been recently developed that operate at cycle speeds greater than about 2 cycles per minute. The use of structured adsorbent beds comprising laminated sheets of immobilized adsorbent avoids issues of bead fluidization and attrition and also allows for decreased pressure drops in the beds. The use of such laminated sheet adsorbent, combined with the use of compact high speed rotary valves allows high PSA cycle speeds to be achieved at high efficiencies.

U.S. Pat. Nos. 4,968,329 and 5,082,473 and application number 2002-0170436 disclose preferred embodiments for a RCPSA bed comprising spirally wound adsorbent sheets of 1 mm or less in thickness. An adsorbent sheet is spirally wound together with a spacer sheet, e.g. a wire mesh spacer sheet, such that the spacer sheet defines flow channels between adjacent sheets of adsorbent. U.S. Pat. No. 5,082,473 suggests that the ratio of half sheet adsorbent thickness to channel gap (b/t) is desirably near unity but could be between 0.5 and 2.0, or in other words, the channel gap could be somewhere between 0.25 to 1 that of the adsorbent sheet thickness. This implies then that the channel fraction in the bed (where channel fraction is defined as the ratio of the channel volume to the total bed volume) is less than 50%.

In many PSA applications, the feed streams may contain small amounts of contaminants that are even more preferentially adsorbed on the adsorbent than those component/s intended to be adsorbed. Such contaminants may be characterized by very strong, and sometimes irreversible, adsorption and may deactivate or poison the adsorbent thereby degrading its capacity and selectivity and thus its ability to function properly. For instance, high nitrogen selectivity, cation exchanged, low silica-to-alumina ratio zeolites are commonly used in the separation of oxygen from air, but these zeolites are very sensitive to water contaminant in the feed stream.

Various methods may be used in conventional PSA to remove contaminants from the feed gas stream and thus guard against degradation of the adsorbent bed. These include upstream clean-up of the feed gas (e.g. feed gas cooling followed by condensation upstream of the PSA device) or adsorption onto regenerable guard beds (which are typically placed at the feed end within the same adsorbent housing of the PSA device). The guard beds serve to adsorb virtually all the contaminant from the feed stream before it reaches the primary adsorbent bed. And, the guard beds are regenerated at the same time as the primary adsorbent bed in the typical PSA cycle. For removal of water contaminant from a feed stream, a dessicant is typically used as a guard layer at the feed end of the beds.

Guard layers for contaminant control within a PSA bed do not contribute to the primary adsorption process and thus effectively add undesirable dead volume to the PSA bed. Preferably, the void space at the ends of the adsorbent beds should be minimized for better recovery. It is thus desirable to minimize the length and internal void volume of such guard layers, while still effectively removing the contaminants in the feed stream. In the prior art, this is generally done by maximizing the amount of guard adsorbent material present in the guard layer while still allowing for acceptable flow of gas through the guard layer. In PSA applications employing zeolite adsorbents in which water is a primary contaminant, typically from 5 to 30% of the adsorber bed is occupied by a guard layer containing alumina, silica gel, activated carbon, or a combination of these. The feed gas is dried to 0.1 to 5 ppm of water vapour before contacting the zeolite adsorbent layers.

Conventional PSA devices are less sensitive to the presence of contaminants in the feed stream than are the recently developed, faster cycle RCPSA devices. The former have relatively longer adsorber beds over which contaminant diffusion must occur and have relatively larger adsorbent inventory so that if a given amount is deactivated, it represents a smaller fraction of the total. Further, the rate of deterioration is dependant on the cumulative number of cycles experienced, which is less for conventional PSA devices over a given time period.

The unexpected sensitivity of RCPSA devices to feed stream contaminants was noted experimentally in U.S. Pat. No. 7,037,358. Various methods were also disclosed therein to protect RCPSA devices against contaminants and particularly against water. For instance, the use of guard layers, similar in design to the primary adsorbent layers, were employed at the feed end of the adsorber beds. The layers generally were disclosed as being thin and having a high surface area, with the flow channels having narrow hydraulic radius in order to overcome mass transfer constraints. It is necessary to reduce the length of narrow flow channels in order to maintain a desirable low pressure drop across the guard bed.

SUMMARY

The present invention concerns embodiments of an apparatus and method pertaining to adsorption beds in RCPSA devices and in protecting the beds against contamination. Specifically, it concerns the design of guard layers employed at the feed end of the beds. Such guard layers preferentially adsorb contaminant components (e.g. water) from the feed gas and exhaust them when flow is reversed through the bed during the exhaust or purge stage of the RCPSA cycle.

It has been discovered that guard layer performance can be improved by actually employing less guard adsorbent and instead employing constructions that provide greater accessibility for adsorption of the contaminants.

An adsorption bed of the invention is for use in a PSA device, particularly an RCPSA device, and has a guard layer at the feed end of the bed. The guard layer comprises a laminate sheet and the sheet comprises a guard adsorbent. Less guard adsorbent is used in the guard layer and there is a corresponding increase in the channel volume or fraction in the guard layer. The channel fraction of the guard layer is greater than 50%, and typically is between 50% and 75%. In certain disclosed embodiments the channel fraction of the guard layer is greater than 50% up to at least 75%.

A common contaminant in many RCPSA applications is water. In such applications, the guard adsorbent employed may be or include a dessicant such as activated alumina.

The laminate sheet may be characterized by a thickness between about 5 and 200 micrometers and a surface area/ (volume of the guard layer) ratio of greater than about 5000 square meters per cubic meter.

To further improve guard layer performance, it can be desirable for the surface of the laminate sheet to be textured thereby introducing a surface void to the laminate sheet. This surface void may be between about 20 and 50%. The laminate sheet may be made using a wire mesh. A method for texturing the surface of the sheet is to coat a suitable wire mesh with a low solids content (i.e. "runny") slurry of the guard adsorbent material.

The guard layer may be made by spirally winding the laminate sheet and a spacer sheet together. The spacer sheet may comprise a wire mesh.

The invention is preferred for RCPSA devices operating at cycle speeds of greater than about 5 cycles per minute.

An experimental method has also been developed for testing the effectiveness of guard layers and thus for assisting in the determination of appropriate operating parameters for a RCPSA device. The method comprises providing a series of gas sampling ports at several locations along the length of a test bed undergoing RCPSA cycling and determining the concentration of the contaminant components at these locations using appropriate sampling instruments (e.g. moisture analyzer, gas chromatograph).

DETAILED DESCRIPTION

Unless expressly defined otherwise, all technical and scientific terms used herein have the meaning as commonly understood by a person of ordinary skill in this art.

Guard layer performance in RCPSA devices can be improved by employing laminate sheet based constructions in which less guard adsorbent is used than is generally used in laminate sheet based adsorbent layers. The improved guard layers are characterized by channel fractions that are greater than 50%.

Figure 1:
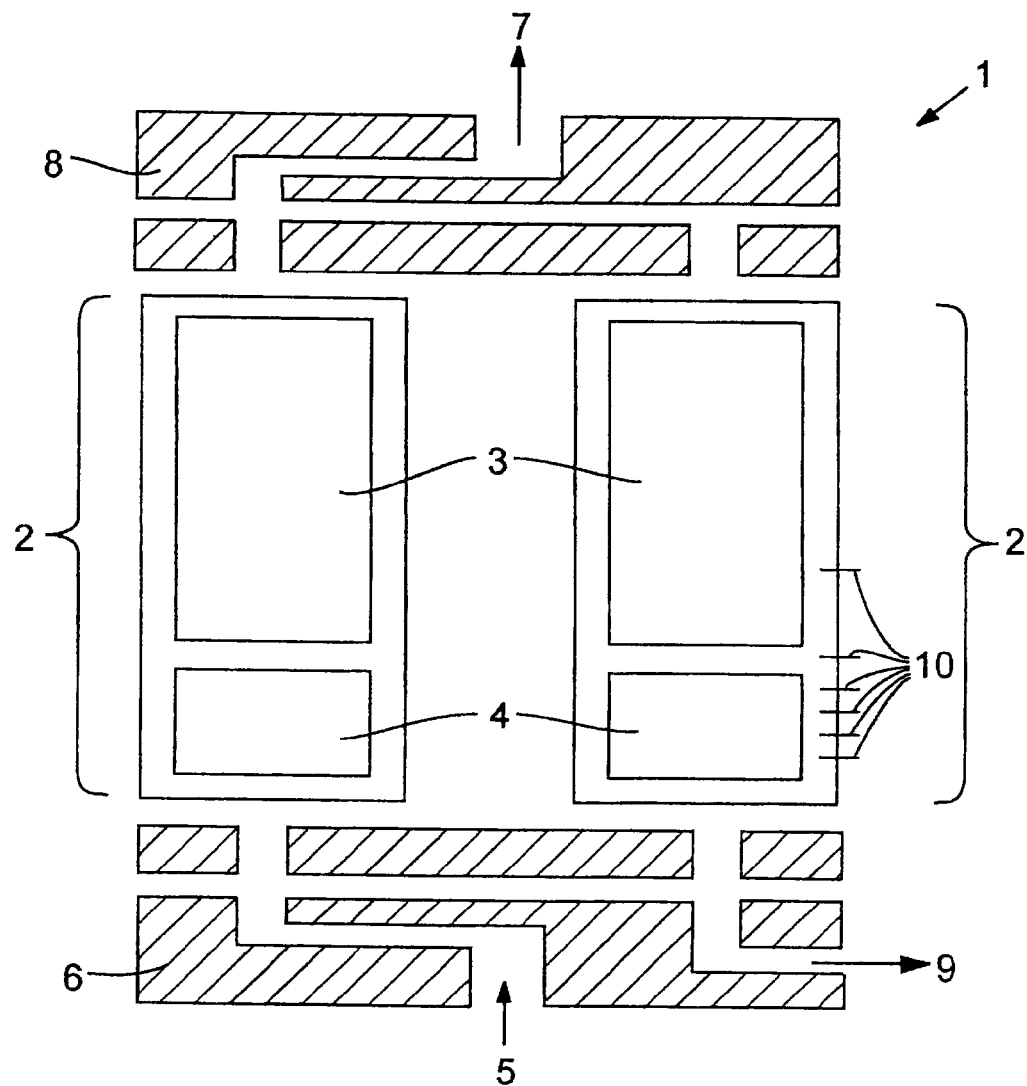
FIG. 1 is a schematic of a RCPSA system comprising 2 spirally wound beds with guard layers for the adsorbents in each bed. Also shown are exemplary sampling sensors for testing the effectiveness of the guard layers.

FIG. 1 shows a schematic of a simple RCPSA system 1 comprising two spirally wound beds 2 with guard layers for the adsorbents in each bed. Beds 2 each comprise a primary adsorbent layer 3 for separating the major components in the feed gas mixture and also a guard layer 4 to protect the primary adsorbent layer 3 from contaminants present in the feed gas mixture. A feed gas mixture 5 is alternately provided to the feed ends of each bed 2 via feed end rotary valve 6. Product gas 7 is alternately obtained from the product ends of each bed 2 via product end rotary valve 8. In this simple system, exhaust gas 9 is vented from the feed ends of beds 2 via rotary valve 6 during the regeneration step in the RCPSA cycle. Also shown in FIG. 1 are exemplary sampling sensors 10 which can be used to test the effectiveness of the guard layers in experimental RCPSA devices.

In commercial embodiments, primary adsorbent layers 3 may actually comprise more than one adsorbent material in order to separate out more than one major component in the feed gas mixture. The different adsorbent materials may be conFIG.d sequentially along adsorbent layer 3 (i.e. in a series of adsorbent layers). In a like manner, guard layers 4 may also comprise more than one guard material for purposes of removing multiple contaminants from the feed gas mixture. Again, the different guard materials may be conFIG.d sequentially along guard layer 4. For instance, in applications where a range of operating temperatures can be encountered, multiple guard layers may be required to remove one or more contaminants from the feed gas mixture.

In the RCPSA device of FIG. 1, adsorbent layers 3 comprise a porous laminate adsorbent sheet containing a suitable adsorbent that is spirally wound together with an appropriate spacer sheet. The spacer sheet is included in order to define channels for gas to flow through and to access both sides of the wound laminate adsorbent sheet. The thickness of typical laminate adsorbent sheets is in the range of 5 to 200 micrometers. The height or gap of the channels formed by the spacer sheet is conventionally less than or equal to the thickness of the laminate adsorbent sheet.

In one embodiment of the present invention, guard layers 4 also comprise a porous laminate sheet containing a suitable guard adsorbent that is spirally wound together with an appropriate spacer sheet. Here however, the channels defined by the spacer sheet occupy greater than 50% of the volume.

Figure 2:
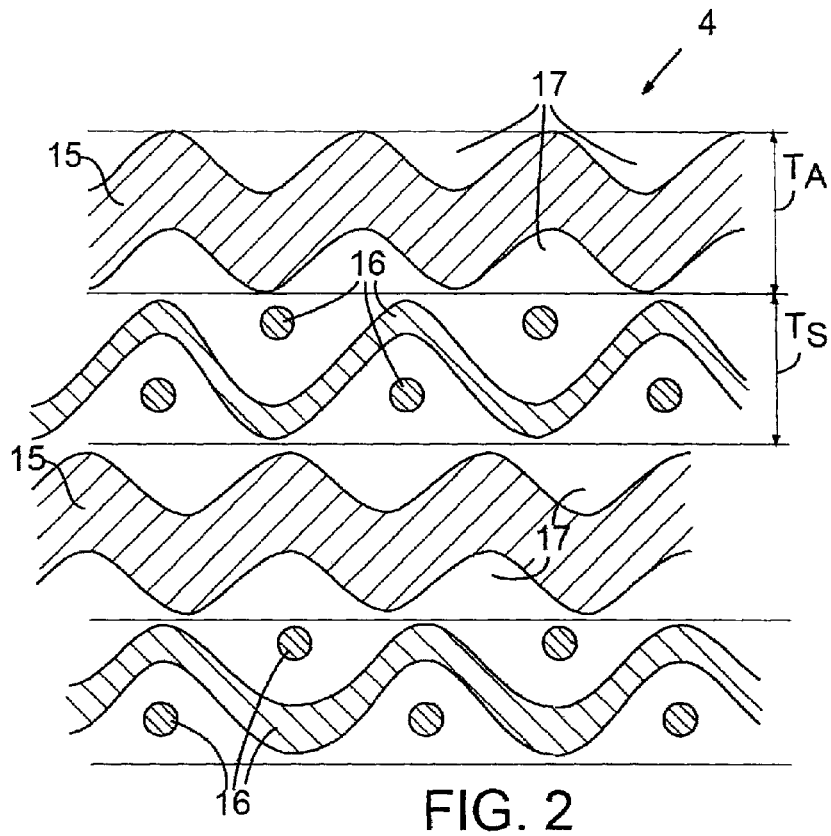
FIG. 2 is a schematic cross-section of a guard layer comprising a spirally wound textured laminate sheet and wire mesh spacer.

FIG. 2 shows a close-up schematic cross-section of guard layer 4. The view shown is parallel to the winding axis. Visible in FIG. 2 are two adjacent winds of laminate guard adsorbent sheet 15 separated by spacer sheet 16. (Note that the winds are of course curved but this is not so apparent in the close-up view shown in FIG. 2.) Adsorbent sheet 15 is a porous sheet comprising particles of guard adsorbent and an appropriate binder coated onto a woven wire metal mesh support. FIG. 2 shows the envelope defined by porous adsorbent sheet 15. (The envelope is a theoretical surface that encloses the solids in sheet 15 and that bridges the openings of its pores.) Sheet 15 shown in FIG. 2 has a textured or "wavy" surface 15a. Thickness $T_A$ is the thickness of adsorbent sheet 15 as measured from peak to peak on the textured surface. Spacer sheet 16 is a woven wire metal mesh. FIG. 2 shows the envelope defined by spacer sheet 16. Thickness $T_S$ is the thickness of spacer sheet 16 as measured from peak to peak on the spacer sheet envelope. Adsorbent sheet 15 physically contacts spacer sheet 16 at a plurality of locations. However, the significant texturing of adsorbent sheet 15 creates relatively large void spaces between the two envelopes, depicted in FIG. 2 as surface voids 17. Herein, the channel fraction is defined as 1 minus the adsorbent sheet fraction, where the adsorbent sheet fraction equals the volume within the envelope of adsorbent sheet 15 divided by total guard layer volume. With reference to FIG. 2, the channel fraction is thus also the same as (channel volume/total volume), where the channel volume is equal to the volume within the spacer mesh envelope plus the volume of the surface voids. (The relatively small volume occupied by the wires in the spacer mesh itself is thus still included in the channel volume.) In guard layers 4 of the invention, the channel fraction is greater than 50% and typically between 50% and 75%.

Thicknesses $T_A$ and $T_S$ are readily measured using a micrometer. An estimate of the surface void can be made by estimating the effective thickness of the sheets via optical microscopy of cross-sectional samples. A preferred method however is based on a liquid displacement test. For this method, a test sample of the adsorbent sheet has its pores filled with a liquid such as water. The water filled adsorbent sheet is then dipped into a second liquid that is immiscible with water (e.g. chlorofluorocarbon), and the volume of the second liquid displaced is determined. The volume displaced is thus the volume within the envelope. And the surface void is then calculated to be the difference between the volume including the surface voids (i.e. Ta* area of sheet sample) minus the volume within the adsorbent sheet envelope (i.e. volume of second liquid displaced).

The choice of guard adsorbent material depends on the separation application. Common materials suitable for use as guard adsorbents include activated alumina, aluminosilicate gels, silica gels, zeolites (e.g. zeolite Y or high silica zeolites), activated carbon, carbon molecular sieves and combinations of these materials. A combination of materials can also be commonly used, e.g. activated alumina plus a zeolite such as 5A and/or 13X. Water is a common contaminant in PSA applications and suitable guard adsorbents for water include desiccants such as activated alumina.

In RCPSA devices, it has been discovered that having greater access to the guard adsorbent material is more important than having a greater mass of material. The greater channel fraction design provides for greater accessibility. A measure of accessibility is the surface area to volume ratio (SA/V) of the guard layer (where the surface area referred to is that of the sheet envelope not the adsorbent particles themselves, and the volume is that of the guard layer and thus includes both the guard adsorbent sheet and channel). As the SA/V ratio increases, the thickness of the guard adsorbent sheet necessarily decreases. It is difficult to measure the envelope surface area of a textured sheet like that depicted in FIG. 2. So, in the Examples below, the SA/V ratio was determined assuming the guard adsorbent sheet was a smooth sheet with thickness $T_A$. There, SA/V of the guard layer was greater than about 5000 square meters per cubic meter.

Texturing the surface of the guard adsorbent sheet further increases accessibility and effectiveness of the guard layer. In addition, the increased channel volume introduced by the surface voids results in reduced pressure drop across the guard layer and hence improved performance.

The sheet surface can readily be textured by web coating a suitable wire mesh with a low solids content (i.e. "runny" or low viscosity) slurry. Preferably the wire mesh is woven and thus has a repeating pattern. When coated, the slurry sags in the openings in the woven mesh before drying, thereby introducing texture to the final dried surface. The texture (e.g. amplitude and period) are mainly functions of the slurry characteristics (e.g. viscosity) and weave pattern (e.g. wire spacing in the weave). In this way, surface voids between about 20 and 50% can readily be introduced in the guard layer.

Note that guard layers 4 are subjected to high velocity feed gas jets during the feed step in the RCPSA cycle, which can result in erosion over a very large number of cycles. To protect them, multi-layer perforated plate or mesh-type flow distributors/jet disrupters (not shown in FIG. 1) can be used upstream of and adjacent to guard layers 4 to re-distribute gas flow across the inlet face of the guard bed. A combination of coarse metal mesh (e.g. 10 mesh) and fine metal mesh (e.g. 325 mesh) may for instance be used. The former provides structural support and gross jet disruption/re-distribution while the latter provides fine jet disruption/re-distribution.

RCPSA devices operate at cycle speeds greater than about 5 cycles per minute, significantly greater than conventional PSA devices. The gas velocities through the guard layer and the pressure drop per unit length are also therefore greater. When operating at a high product recovery level, another consideration is the feed to product gas volume ratio required for proper guard layer performance.

The feed-to-product gas volume ratio is a measure which approximates the volumes of gases which pass over the guard layer in opposite directions during the feed and regeneration parts of the cycle. Operating at a relatively high feed/product ratio means that the device is operating at low product yield which is undesirable from that viewpoint. However, it also means that a relatively large volume of gas is exhausted back through the guard layer during the regeneration phase of the cycle for desorbing contaminant from the guard layer. A lower feed/product ratio is better from a product yield perspective but means less exhaust gas is available to desorb contaminant and thus may not be adequate for guard layer performance.

With regards to guard layer performance, when feed gas is flowing, the target equilibrium concentration of contaminants at the end of the guard layer must be sufficiently low so as to minimize degradation of adsorption on the downstream primary adsorbent. Generally in practice, this means contaminant levels should be reduced to <10 ppmv and preferably <1 ppmv. For instance, in the case of water vapour on zeolites, the water level is preferably <10 ppmv and more preferably <1 ppmv for long term cyclical stability.

Testing guard layer performance in a RCPSA device can be more difficult than in conventional PSA devices. Conventional methods based on measuring contaminant concentration in the product stream or monitoring PSA performance as a function of time have been found to be misleading and non-predictive. Instead, a new method has been developed based on measuring when breakthrough of the contaminant through the guard layer occurs during the feed or production step of the PSA cycle.

The new test method involves installing gas sampling ports along and within the guard layer and also at the interface gap between the guard layer and the primary adsorbent layer. Suitable locations of the sampling ports 10 for disclosed embodiments are depicted in the complete RCPSA device 1 in FIG. 1. However, testing for development purposes is expected to typically be performed on a test station in which a single test bed is employed. The test station uses computer controlled solenoid valves to control the sequence and timing of gases into and out of the test bed and manual flow control valves to control flow rate. Accumulator tanks are also used to collect discharged gases and to return these to the same test bed in order to simulate multi-bed PSA cycle flows. Such a test station allows for the experimental assessment of multi-bed PSA cycle performance using a single test bed over a wide range of cycle speeds.

In the test apparatus, a small fraction of internal gas is extracted to analyze contaminant content (e.g. by moisture analyzer) at a desired point in the cycle. If sampling is wanted only during the feed or production step, each sampling port can be equipped with a timing valve that opens only during the high-pressure feed step. It was found that a pressure relief valve or check valve with a pre-set cracking pressure was an effective means for gas sampling only during the highest pressure feed step of the PSA cycle. A computer controlled solenoid valve is a suitable alternative. For continuous measurement, a fine flow control valve connected to each sampling port valve is effective and a section of fine bore capillary tubing is a suitable alternative. It was found that this sampling procedure did not impact performance of the test bed (confirmed experimentally by establishing cyclical steady state with and without sampling and observing the same results within experimental error).

The materials, methods, and examples described herein are intended to be illustrative only and are not intended to limit the invention to the specific materials, methods and examples disclosed.

EXAMPLES

Three experimental spirally wound laminate test beds were made using a zeolite as the primary adsorbent and activated alumina as a guard layer dessicant. The zeolite laminate sheets were reinforced with inert binder and stainless steel woven mesh. The laminate sheets were spirally wound together with a stainless steel woven mesh spacer sheet on a centre mandrel to form the primary adsorbent layers. The guard layers comprised guard laminate sheets of activated alumina with variable surface voids. These too were reinforced with inert binder and stainless steel woven mesh and were spirally wound together with a stainless steel mesh spacer sheet to form the guard layers. Each test bed consisted of one experimental guard layer and a primary adsorbent layer sealed in a stainless steel containment tube.

The experimental beds were tested on a solenoid valve based, computer controlled, single bed test apparatus that was used to simulate operation in an actual operating RCPSA device. The test feed gas used was humidified compressed air. For regeneration, the beds were simply allowed to depressurize from the feed end.

As disclosed in relation to FIG. 1 before, gas was sampled for water content at various locations during the adsorption (production) step of the cycle. (Water content was not measured during regeneration.) Sampling ports were located at from 0.5 to 2.0 inches from the feed end of the beds (these would be within the guard layer itself), at 2.5" from the feed end (this would be in the ⅛" gap at the AA guard layer/zeolite layer interface), and at 3.0" from the feed end (within the zeolite layer itself). An Amatek Model 5800 Moisture Analyzer capable of measurements of from 0.02 ppmv to 1000 ppmv was used to continuously monitor the water concentration when measuring low concentrations. Cosa XDT-PM/LPDT Humidity & Temperature Transmitters were used at intermediate water concentrations. Vasiala HPM238 or Elextronics EE29 Humidity & Temperature Transmitters were used to measure the highest concentrations.

Table 1 below summarizes certain important physical characteristics of the guard layers tested. Each dessicant sheet in the guard layers was prepared as described above, by coating a wire mesh support with a low viscosity slurry containing the activated alumina. A number 70 stainless steel woven mesh (made of 0.003" wires) was used in all cases. The length of each guard layer in the bed was 2.5". The laminate dessicant sheet and spacer sheet peak-to-peak thicknesses were measured using a micrometer. Total dessicant loading and the surface area per unit volume of the dessicant were determined. The surface void of the dessicant sheets was measured using the Archimedes method described earlier. Here, the activated alumina sheets were first saturated with water to completely fill the void space within. Then, the samples were immersed in Vertrel, a chlorofluorocarbon liquid that is immiscible with water, to determine volume displaced. This volume displaced would thus not include the surface void of the dessicant laminate. The surface void was then calculated to be the difference between the calculated dessicant laminate volume (based on its measured length, width, and thickness $T_A$ as defined in FIG. 2) and this volume displaced. In Table 1, the effective dessicant sheet thickness and effective channel height are also given. The effective dessicant sheet thickness represents the equivalent thickness of a flat, non-textured dessicant sheet that would occupy the same volume as the actual textured dessicant sheet. And, the effective channel height represents the equivalent height of the channel that would exist if the actual textured dessicant sheet in the guard layer were considered to be replaced by an equivalent flat, non-textured dessicant sheet. Finally, the channel fraction (equal to the effective channel height divided by the effective channel height plus the effective laminate thickness) is given.

TABLE 1

| | Guard layer sample number | | |
|---|---|---|---|
| | 1 | 2 | 3 |
| Dessicant loading on laminate sheet (gAA/ft$^2$) | 9.6 | 5.2 | 3.6 |
| Dessicant sheet thickness, $T_A$ (0.001") | 6.2 | 5.7 | 5.7 |
| Spacer sheet thickness, $T_S$ (0.001") | 5.5 | 4.8 | 4.8 |
| Activated alumina in guard layer (total g) | 30.7 | 18.4 | 12.8 |
| SA/V Ratio (sq.m/cu.m) | 6766 | 7452 | 7569 |
| Surface void of dessicant sheet (vol. %) | 20% | 39% | 50% |
| Effective dessicant sheet thickness (0.001") | 5.0 | 3.5 | 2.9 |
| Effective channel height (0.001") | 6.7 | 7.0 | 7.6 |
| Channel fraction | 57% | 67% | 72% |

Figure 3:
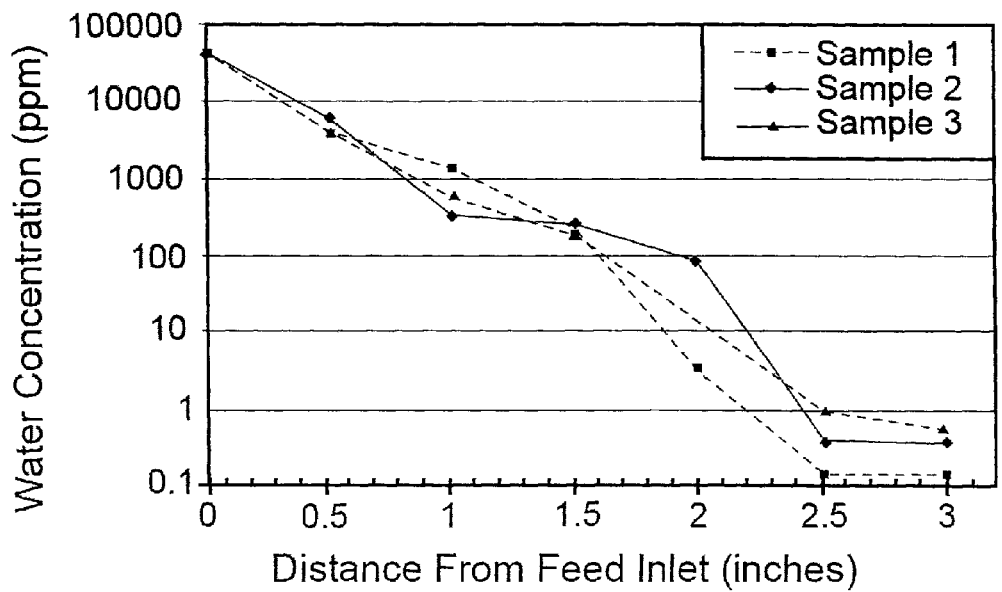
FIG. 3 is a graph of distance from feed inlet (inches) versus water concentration (ppm) showing the water concentration versus distance from feed end for the inventive guard layers tested in the Examples.

Each experimental bed was operated at simulated RCPSA conditions of 20 cpm, 40° C., 40,000 ppm feed humidity level and a feed/product gas ratio of about 7. FIG. 3 shows the water concentration measured versus distance from feed end for the inventive guard layers tested in the Examples. These experimental guard layers have channel fractions substantially greater than 50% and demonstrate unexpectedly good performance.

Figure 4:
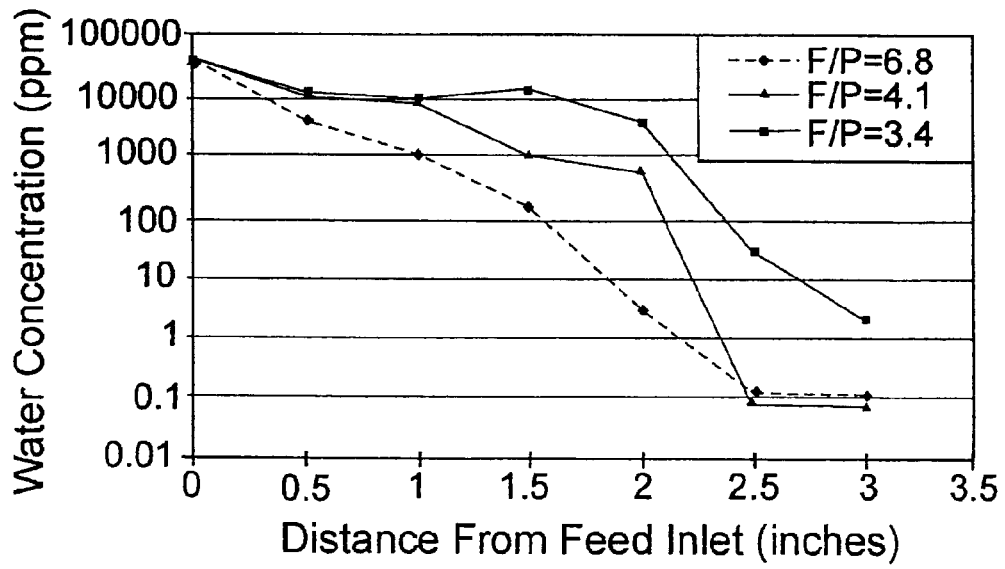
FIG. 4 is a graph of distance from feed inlet (inches) versus water concentration (ppm) showing the water concentration versus distance from feed end as a function of feed/product (F/P) ratio for one of the inventive guard layers tested in the Examples.

Further testing was performed on guard layer sample 1 to illustrate the effect of a varied feed/product ratio (F/P from 3.4 to 6.8) on performance. FIG. 4 shows the water concentration versus distance from feed end as a function of feed/product ratio under otherwise similar operating conditions. As can be seen in FIG. 4, at a feed/product ratio of 3.4, an unacceptable level of water vapour (31 ppmv) entered the zeolite adsorbent layer.

Figure 5:
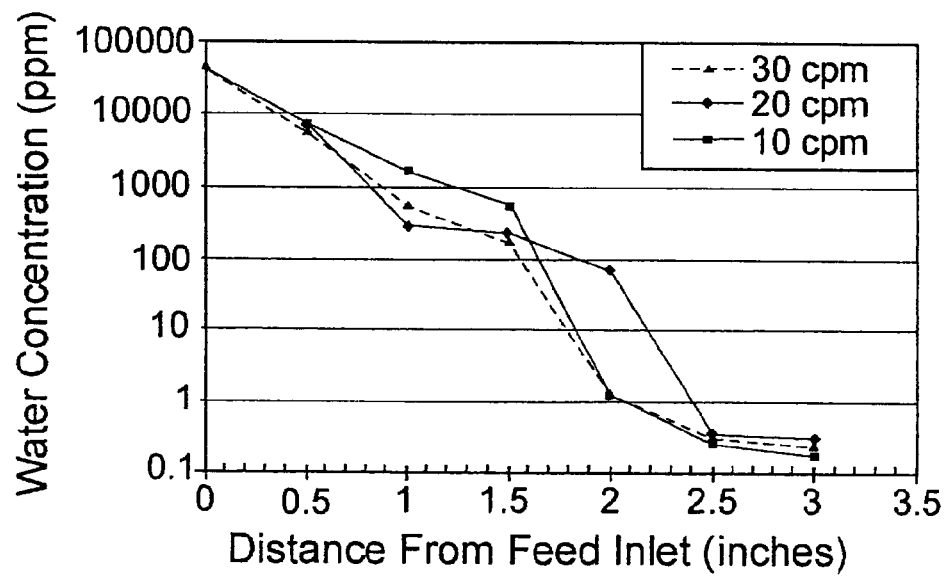
FIG. 5 is a graph of distance from feed inlet (inches) versus water concentration (ppm) showing the water concentration versus distance from feed end as a function of cycle speed for one of the inventive guard layers tested in the Examples.

Further testing was performed on guard layer sample 2 to illustrate the effect of a varied RCPSA device cycle speed (from 10 to 30 cpm) on performance. FIG. 5 shows the water concentration versus distance from feed end as a function of cycle speed under otherwise similar operating conditions (F/P ratio was always about 7.1). Little effect on performance is seen in the FIG. 5 data over the cycle speeds tested. A shift in the location in the water front by about 0.25" (or approximately 10% of the length of the guard layer) was observed when cycle speed was changed from 10 to 30 cpm.

The present application has been described with reference to examples of preferred embodiments. It will be apparent to those of ordinary skill in the art that changes and modifications may be made without departing from this invention. For instance, the invention may be employed in guard layers for RCPSA device applications involving contaminants other than water.

We claim:

1. An adsorption bed for a rapid cycle pressure swing adsorption (RCPSA) device comprising a guard layer at the feed end of the bed, the guard layer comprising a laminate sheet comprising a guard adsorbent, wherein the channel fraction of the guard layer is greater than 50%.

2. The adsorption bed of claim 1 wherein the channel fraction of the guard layer is between 50% and 75%.

3. The adsorption bed of claim 1 wherein the guard adsorbent is a dessicant.

4. The adsorption bed of claim 3 wherein the dessicant is activated alumina.

5. The adsorption bed of claim 1 wherein the thickness of the laminate sheet is between about 5 and 200 micrometers.

6. The adsorption bed of claim 1 wherein the surface area of the laminate sheet divided by guard layer volume is greater than about 5000 square meters per cubic meter.

7. The adsorption bed of claim 1 wherein the surface of the laminate sheet is textured thereby introducing a surface void to the laminate sheet.

8. The adsorption bed of claim 7 wherein the surface void is between about 20 and 50%.

9. The adsorption bed of claim 7 wherein the laminate sheet comprises a wire mesh.

10. The adsorption bed of claim 1 wherein the guard layer is a spiral winding of the laminate sheet and a spacer sheet comprising a wire mesh.

11. A rapid cycle pressure swing adsorption (RCPSA) device comprising at least one adsorption bed of claim 1.

12. A method of protecting the beds in a RCPSA device against contamination, the RCPSA device comprising at least one adsorption bed and a guard layer at the feed end of the bed, and the guard layer comprising a laminate sheet comprising a guard adsorbent, wherein the method comprises employing a channel fraction in the guard layer of greater than 50%.

13. The method of claim 12 wherein the contaminant is water.

14. The method of claim 12 wherein the cycle speed of the operating RCPSA device is greater than about 5 cycles per minute.

15. The method of claim 12 comprising texturing the surface of the laminate sheet.

16. The method of claim 15 wherein the texturing comprises coating a wire mesh with a low solids content slurry.

17. The method of claim 12 wherein the guard layer is a spiral winding of the laminate sheet and a spacer sheet and the method comprises employing a wire mesh for the spacer sheet.

* * * * *